United States Patent [19]

Lenski et al.

[11] 4,408,947

[45] Oct. 11, 1983

[54] CONVEYOR ARRANGEMENT FOR A COMBINE HARVESTER

[75] Inventors: Ralph Lenski; Rolf W. Peiler, both of Zweibrucken; Klaus H. Pauli, Homburg, all of Fed. Rep. of Germany

[73] Assignee: Deere & Company, Moline, Ill.

[21] Appl. No.: 258,503

[22] Filed: Apr. 28, 1981

[30] Foreign Application Priority Data

May 2, 1980 [DE] Fed. Rep. of Germany ....... 3016840

[51] Int. Cl.³ .......................... B60P 1/40; B65G 33/14
[52] U.S. Cl. .................................... 414/526; 198/608; 198/661; 198/666
[58] Field of Search ............... 198/611, 612, 661, 666, 198/667, 668, 608; 414/502, 503, 504, 505, 526

[56] References Cited

U.S. PATENT DOCUMENTS

| | | | |
|---|---|---|---|
| 2,783,906 | 3/1957 | Helms | 214/519 |
| 3,108,703 | 10/1963 | Horne et al. | 414/505 |
| 3,175,676 | 3/1965 | Schaaf | 198/668 X |
| 3,570,654 | 3/1971 | Hill | 198/662 X |
| 3,593,844 | 7/1971 | Barclay et al. | 198/661 |
| 3,896,923 | 7/1975 | Griffith | 198/661 |
| 4,067,343 | 1/1978 | Muijs et al. | 130/27 R |

FOREIGN PATENT DOCUMENTS 852210 10/1960 United Kingdom .

*Primary Examiner*—Robert B. Reeves
*Assistant Examiner*—David F. Hubbuch

[57] ABSTRACT

A combine conveyor arrangement for transferring clean grain from a cleaning shoe to a grain tank above the shoe comprises two drivably connected screw conveyor legs whose axes lie in a common vertical plane. A unitary housing at their junction provides bearing support for the respective screw conveyors, an enclosure for a pair of bevel gears transmitting power between the two, and a transfer passage for receiving the discharged material from the first leg and conducting it to the second leg. The first leg is substantially horizontal and the second is inclined upwardly and inwardly so that the included angle between the two conveyor legs is substantially less than ninety-degrees, and the transfer passage is offset inwardly and upwardly from the intersection of the conveyor axes.

8 Claims, 4 Drawing Figures

CONVEYOR ARRANGEMENT FOR A COMBINE HARVESTER

BACKGROUND OF THE INVENTION

The invention relates to a screw conveyor arrangement particularly adaptable for use in a combine harvester and more particularly, for conveying and elevating clean grain from a cleaning shoe to a grain tank above the shoe.

For convenience, the present invention will be discussed with reference to the requirements for clean grain handling in a combine although it is adaptable to any screw conveyor system involving a change of conveying direction from generally horizontal in one direction to generally upward, with the total change of direction being more than ninety degrees.

The most common combine clean grain handling arrangement, especially for larger combines, involves three conveyor legs: a lower transverse conveyor beneath the cleaning shoe for collecting and conveying clean grain to one side of the combine; a generally upright conveyor to elevate the clean grain to the level of the grain tank; and a third conveyor leg for conveying the grain laterally and delivering it to a central portion of the grain tank. However, U.S. Pat. No. 4,067,343 Muijs, discloses an arrangement in which the upright conveyor leg is inclined inward so that it delivers material close to the center of the grain tank thus eliminating the need for an upper lateral conveyor. Screw conveyors are used, but the upright conveyor is offset from the transverse bottom conveyor, requiring a relatively complex and costly transfer housing and drive arrangement at the junction of the two portions of the conveyor.

British Pat. No. 852,210 Hansen discloses (but only in the context of a grain wagon) a simplified screw conveyor arrangement for changing direction from a horizontal to an upright portion. The axes of both screw conveyor portions lie in a common plane and, at their junction, their shafts are drivably connected through a pair of bevel gears external to the passages through which grain is conveyed. However, the change of direction between the two conveyor portions is limited to ninety degrees and transfer from one conveyor portion to the other, is somewhat indirect and relies, at least in part, on deflecting surfaces within a transfer housing, friction of grain on these surfaces results in relatively high power consumption as well as increased possibility for grain damage.

SUMMARY OF THE INVENTION

Accordingly it is an object of the invention to provide in a screw conveyor arrangement, a simple and efficient means of changing direction of material conveyance from a generally horizontal direction to a generally upward direction with a total change of direction of more than ninety degrees, while minimizing power consumption and grain damage.

According to the invention, the axes of two screw conveyor portions may lie in a common plane and include between them an angle of less than ninety degrees. Applied to a combine harvester, such a conveyor arrangement makes it possible to collect and transfer clean grain from a cleaning shoe to a central upper portion of a combine grain tank above the shoe, simply and efficiently and without the need for supplementary conveyor means. Preferably, the included angle between the two conveyor portions is between about sixty-five and eighty-five degrees or about seventy-five degrees.

According to the invention, the tubes of the two screw conveyor portions are preferably closed or blocked at their juxtaposed ends, each end part being provided with a bearing for a shaft of the respective feed screw. The ends of the shafts of feed screws are drivably interconnected by driving elements such as bevel gears outside the conveyor tubes. It is preferable that the respective conveyor tube end or closing portions which serve as bearing supports should have surfaces closely adjacent the ends of the screw portions of the conveyors and that these surfaces should be approximately perpendicular to the axes of the conveyor portions; and that they be contiguous at a line or surface of intersection, forming part of the wall of a passage connecting the two conveyor portions.

According to the invention, a connecting and housing structure or elbow assembly may provide: an enclosure for the drive connection between the respective screw conveyor portion shafts; openings for receiving and communicating with both the horizontal and upright portions of the screw conveyor assembly; and an internal passage connecting the two screw conveyor portions, shaped so as to offer a minimum obstruction and hence, minimum power consumption when grain is being conveyed. At a zone of minimum cross-sectional area, the direction of this passage is preferably approximately perpendicular to a bisector of the included angle between the axes of the two screw conveyor portions.

To assist in control of conveyed material adjacent the change of direction, the screw conveyors may have double-start flighting and the horizontal portion may have, immediately adjacent the closure of the conveyor tube, generally radially extending paddles for discharging and slinging grain up into the upright conveyor portion.

For ease of manufacture and assembly, the connections between the junction housing and the respective conveyor tubes may be made flanged, especially in the case of the lower connection, so as to facilitate relative rotational movement between the tube and the junction housing, for alignment purposes in assembly.

An advantage of a conveyor arrangement according to the invention is that clean grain may be conveyed from the cleaning shoe of a combine to an upper central portion of a grain tank above the shoe by two simple screw conveyor portions, lying in a common plane and including an angle between their axes of less than ninety degrees. A connecting structure or housing may house a simple bevel gear driving connection, and a housing passage connecting the respective conveyor tubes and providing for centrifugal discharge from the horizontal or feeding screw and direct reception by the upright screw portion. The transfer passage in the housing connecting the two screw conveyor portions is shaped so that at least some of the grain may be discharged from the first conveyor and impinge on the second without being deflected by the housing walls.

DESCRIPTION OF THE PREFERRED EMBODIMENT

Figure 1:
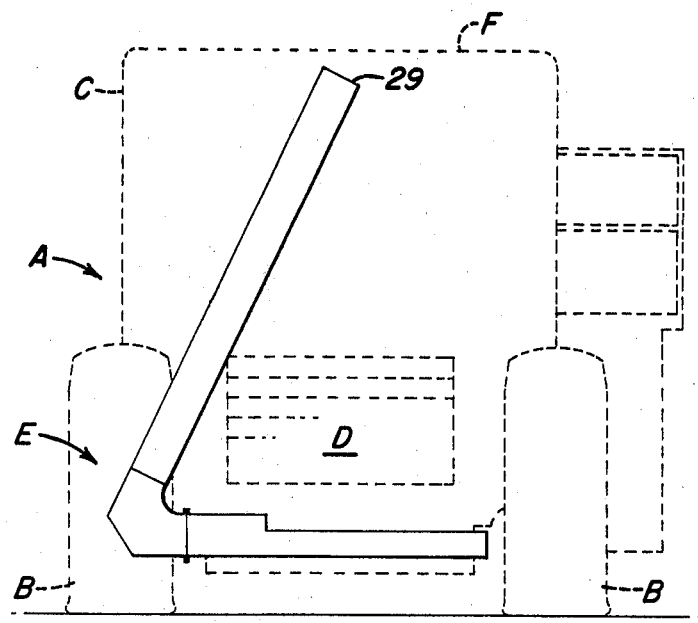
FIG. 1 is an end view of a combine harvester embodying a screw conveyor arrangement according to the invention, with the combine shown in schematic outline only.

The invention is embodied in an otherwise conventional, self-propelled combine illustrated in schematic end view in FIG. 1. The combine body A is supported above the ground on wheels B and includes a generally central grain tank C in an upper portion of the body, approximately symmetrically disposed above a conventional cleaning shoe D. A conveyor assembly E receives clean grain from the cleaning shoe D and conveys it to the grain tank C.

Figure 2:
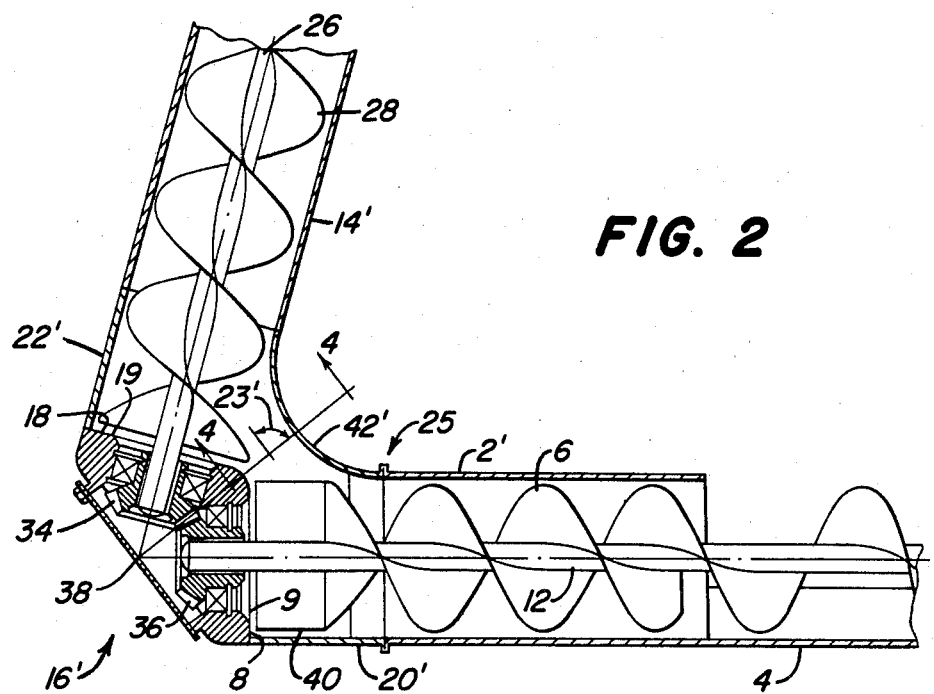
FIG. 2 is an enlarged partial cross-sectional view of the clean grain conveying system of the combine taken in the plane of the axes of the screw conveyors.
Figure 3:
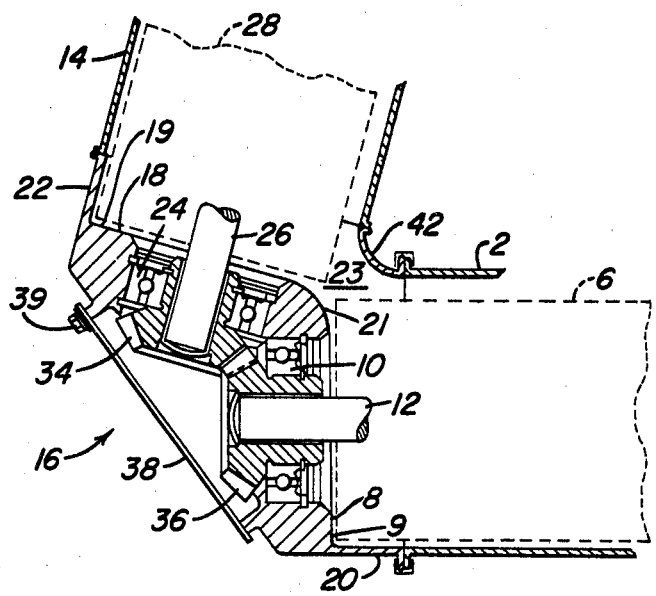
FIG. 3 is similar to FIG. 2 but further enlarged and showing an alternative embodiment of the invention.

As seen best in FIG. 2, the lower or horizontal portion of the conveyor assembly E includes a transverse conveyor tube 2 connected to a receiving trough 4 which receives clean grain from the cleaning shoe D. Mounted within the conveyor tube 2 is a feed screw 6 which is driven at its upstream end by a conventional drive mechanism (not shown). Turning to FIG. 3, the conveyor tube 2 is connected in the region of the delivery end of the feed screw 6 to a tubular socket portion 20 of a connecting housing 16 which is provided with a vertically extending wall 8 for the reception of a rolling bearing 10 in which is rotatably mounted a shaft 12 carrying the feed screw 6. The inner surface 9 of the wall 8 spans and substantially closes the end of the tube 20. The wall surface 9 is a barrier, setting a limit to the axial conveyance of grain in the horizontal conveyor portion.

Figure 4:
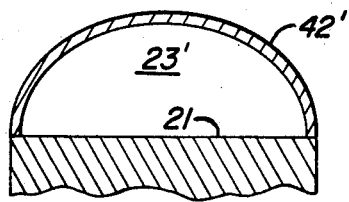
FIG. 4 is a partial cross-sectional view on line 4—4 of FIG. 2 showing the shape of the passage between the two portions of the conveyor at its narrowest point.

The tubular socket portion 20 which accommodates the feed screw 6 adjoins an upwardly extending tubular socket portion 22 which is inclined to the conveyor tube 2. This tubular socket portion 22, together with the socket portion 20, (both portions of the housing 16) serves for the reception of an upright conveyor tube 14 which is also inclined. At the lower end of the tubular portion 22 there is provided an end wall 18, similar to the wall 8, having an inner surface 19, which forms part of the housing 16 and defines with the end wall 8 a downwardly open, obtuse angle. The end wall surfaces 9 and 19 may intersect in the region of the bisector of the angle enclosed by the axes of the two feed screws 6 and 28 and may be rounded off at a surface of intersection as indicated at 21 in FIG. 3, to improve the flow of grain from lower to upper conveyor. An outer wall 42 of the connecting passage 23 between the tubular parts 20 and 22 may also be rounded off as shown in FIG. 3. However, it is also possible, as shown in FIG. 2, for the connecting portion 42' between the inner sides of the tubular parts 20 and 22 to be constituted by a more generously radiused tubular part, (as indicated in FIGS. 2 and 4) so that the flow area at the most constricted zone within the housing 16 may thus be enlarged.

The tubular socket portion 20 of the housing 16, which extends generally horizontally, may for example be connected with the conveyor tube 2 by a rotary flanged joint 25 which allows angular movement of the conveyor tube 14 with respect to the conveyor tube 2 for convenience in assembly. As suggested by FIG. 3, the housing 16 may be a unitary structure, for example a casting, forming an "elbow" in the conveyor system and providing bearing support for the respective screw conveyor portions as well as connections for the conveyor tubes and a transfer passage 23.

Within the upwardly extending conveyor tube 14 there is located a shaft 26 for a feed screw 28 which is rotatably received in a rolling bearing 24 provided in the end wall 18. The axis of the feed screw 6 intersects the axis of the feed screw 28 within the housing 16 at an acute angle $\alpha$. The angle $\alpha$ between the two axes is less than ninety degrees so as to facilitate central delivery into the grain tank C without using an upper lateral conveyor. In this embodiment, the discharge end 29 of the upper conveyor is disposed approximately on the fore-and-aft centerline of the grain tank C and discharges at a level just below its upper rim F.

As is clear, more particularly from FIG. 3, the ends of the shafts 12 and 26 are located outside the passage 23 and have intermeshing bevel gears 34 and 36 which are covered over on the outside by a removable cover plate 38. The cover plate 38 is fixed to the housing 16 by bolts 39. Due to the advantageous arrangement of the bevel gears 34 and 36 outside of the conveying passage 23 the minimum available flow passage cross-sectional area between the tubular parts 20 and 22 (passage 23) is increased, so that the harvested material can pass smoothly and directly from the conveyor tube 2 to the conveyor tube 14. The gear arrangement chosen is also most compact and advantageous in that, adjacent the passage 23, where the feed screws 6 and 28 are in closest proximity the paddles 40 and screw 28 are moving in the same direction across the ends of the passage 23.

The feed screw 6 has a double-start portion in the portion enclosed within the conveyor tube 2 and is provided at its outboard end with one or more radially extending vanes or paddles 40 which sling and deliver the harvested product to the receiving end of the feed screw 28. The feed screw 28 may also have a double-start portion at its lower end which extends, for example, for about three helical turns, the double-start screw portions serving to improve the efficiency of conveying of the harvested material through the conveyor change of direction. Thus a radial paddle 40 may be associated with each helical screw portion of the horizontal feed screw 6 in its double-start portion, doubling the discharge surfaces available for throwing material up into engagement with the screw 28 of the upright conveyor portion.

As can be seen in FIG. 2, the inward or reverse inclination of the upper conveyor portion in combination with the generous curvature of the connection portion 42' makes possible a passage 23' such that a grain kernel discharged by the paddles 40 may travel directly to the feed screw 28 without deflection by the outer walls of the passage (such as connection portion 42'). The disposition of the tube closing surfaces 9 and 19 is chosen so that the cylinders of revolution described by the paddles 40 and upper screw 28 are closely spaced so as to minimize dead space between the active conveyor members. Also the passage 23' is disposed inwardly and upwardly of the intersection of the conveyor leg axes and the bevel gears 34 and 36 so that grain may flow more smoothly from the lower to the upper conveyor. The conveyor end surfaces 9 and 19 prevent movement of grain axially across the ends of the conveyor screws so that discharge from the lower leg and reception by the upper leg is essentially through the circumferential peripheries of the respective conveyor screws. Thus the efficiency of transfer to grain is enhanced and grain damage reduced.

We claim:

1. In a combine harvester, an improved screw conveyor system for receiving grain passing downwards from a cleaning shoe and discharging it to a receptacle above the shoe comprising:

a first generally horizontal conveyor leg including a first conveyor screw and a first cylindrical conveyor tube at least partially surrounding the screw and having an outboard end and disposed in a receiving relationship with the cleaning shoe for receiving grain and conveying it laterally in a first direction to the outboard end;

a second generally upright conveyor leg including a second conveyor screw and a second cylindrical conveyor tube at least partially surrounding the screw and having opposite upper and lower ends and disposed with its axis coplanar with the axis of the first conveyor leg and inclined from the vertical in a second direction opposite the first direction so that the upper end is substantially inboard of the outboard end of the horizontal conveyor leg;

an elbow connecting the first and second conveyor legs and including a pair of generally tubular socket portions for receiving axially the ends of the respective conveyor screws, each socket portion being defined in part by an internal wall of the elbow, each wall extending perpendicular to the axis of the respective leg, and spanning substantially the full diameter of its conveyor tube so that the juxtaposed walls meet at a surface of intersection and a passage having an inlet and an outlet and communicating with the respective horizontal and upright legs for permitting the transfer of grain between them, said passage being defined in part by the surface of intersection and, generally opposite it, an outer passage wall, so that the inlet and outlet of the passage register substantially only with portions of the circumferential periphery of the respective conveyor screws; and means carried by the first conveyor screw, adjacent the outboard end, for impelling grain through the passage into the second tube.

2. The screw conveyor system of claim 1 wherein the outer wall of the passage is curved and generally tangential at its opposite ends to the walls of the conveyor tubes and wherein a tangent to said curved passage wall perpendicular to the axis of the first conveyor screw, passes inboard of the outboard end of said screw.

3. The screw conveyor system of claim 2 wherein the impelling means includes a paddle extending generally radially to the axis of the first conveyor screw and disposed so that a particle of crop material impelled in a free trajectory by at least a portion of the paddle may move so as to be engaged directly by the second conveyor screw without contacting the outer wall of the passage.

4. The screw conveyor system of claim 1 wherein each conveyor screw carries a coaxial shaft at the respective outboard and lower ends, said shafts extending into and being rotatably supported by the elbow assembly and further including means for drivably interconnecting the shafts such that adjacent portions of the respective conveyor screws move in the same direction.

5. In a crop harvester, a screw conveyor arrangement comprising a first generally horizontal screw conveyor portion and a second upwardly extending screw conveyor portion connected to the first conveyor portion in a crop material transfer relationship, the two conveyor portions each including a screw assembly having a screw portion and a coaxial drive shaft and a conveyor tube at least partially surrounding the screw assembly and being disposed so that their longitudinal axes lie in a common plane and so that they may be directly drivably connected with each other at their adjoining ends through their drive shafts, characterized in that the angle between the axes of the two conveyor portions is less than ninety degrees and including means for facilitating the transfer of grain from the horizontal conveyor portion to the upwardly extending portion including a passage communicating with the circumferential peripheries of the respective screw portions adjacent their respective adjoining ends and disposed so that transfer is essentially only between said portions of the circumferential peripheries of the respective screw portions and that the connection of the conveyor portions includes means for closing off the conveyor tubes at their adjacent respective ends and for providing each end part with a bearing for the respective shaft, and drive elements carried by the shafts outside the conveyor tubes for rotation with the shafts, the shafts being drivably interconnected by the drive elements and that the conveyor tubes are generally cylindrical and the means for closing the conveyor tubes includes, for each conveyor portion, a surface substantially spanning the diametral extent of the respective conveyor tube perpendicular to the axis of the respective screw assembly and abutting its screw portion, said surfaces meeting at a surface of intersection.

6. A conveyor arrangement according to claim 5, wherein the passage communicates at its opposite ends with the respective conveyor tubes, said passage being approximately perpendicular to the bisector of the angle between the conveyor portions and having a zone of minimum cross-sectional area defined in part by the intersection of the tube closing surfaces.

7. A conveyor arrangement according to claim 6, wherein the second conveyor portion is pivotable about the axis of the first conveyor portion so as to facilitate assembly.

8. A conveyor arrangement according to claim 5, wherein the screw portion of the first screw assembly includes at least one substantially radially extending discharge paddle adjacent the respective closing surface.

* * * * *